Oct. 3. 1933.     A. F. DORMEYER     1,928,965
ELECTRIC MOTOR UNIT
Original Filed Dec. 23, 1929     4 Sheets-Sheet 1
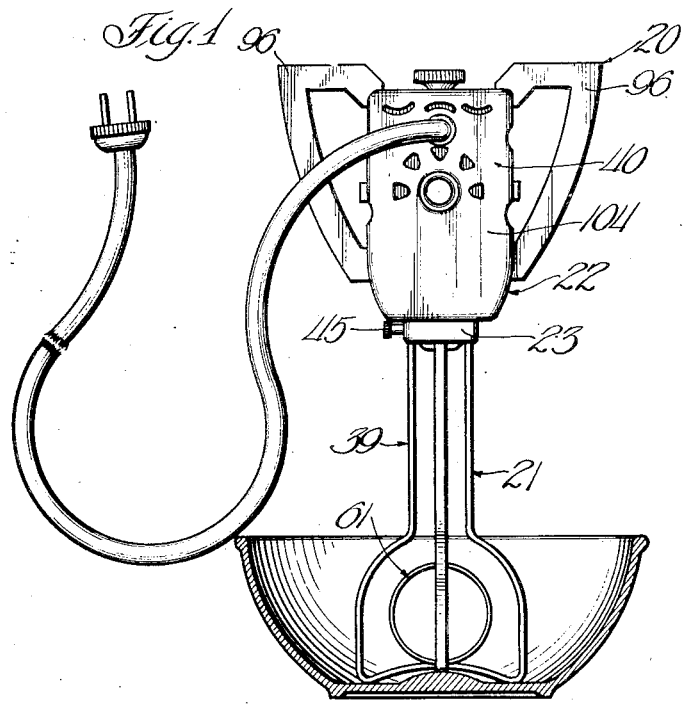
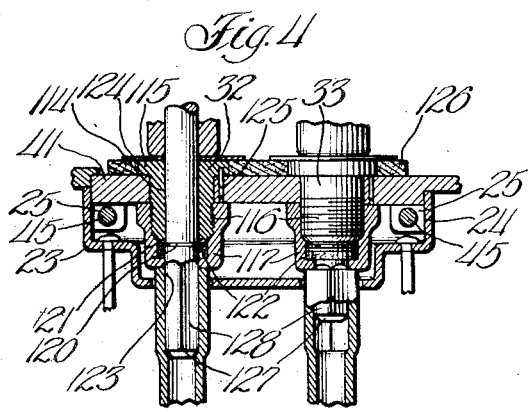
Inventor
Albert F. Dormeyer
By Williams, Bradbury,
McCaleb & Hinkle
Attorneys

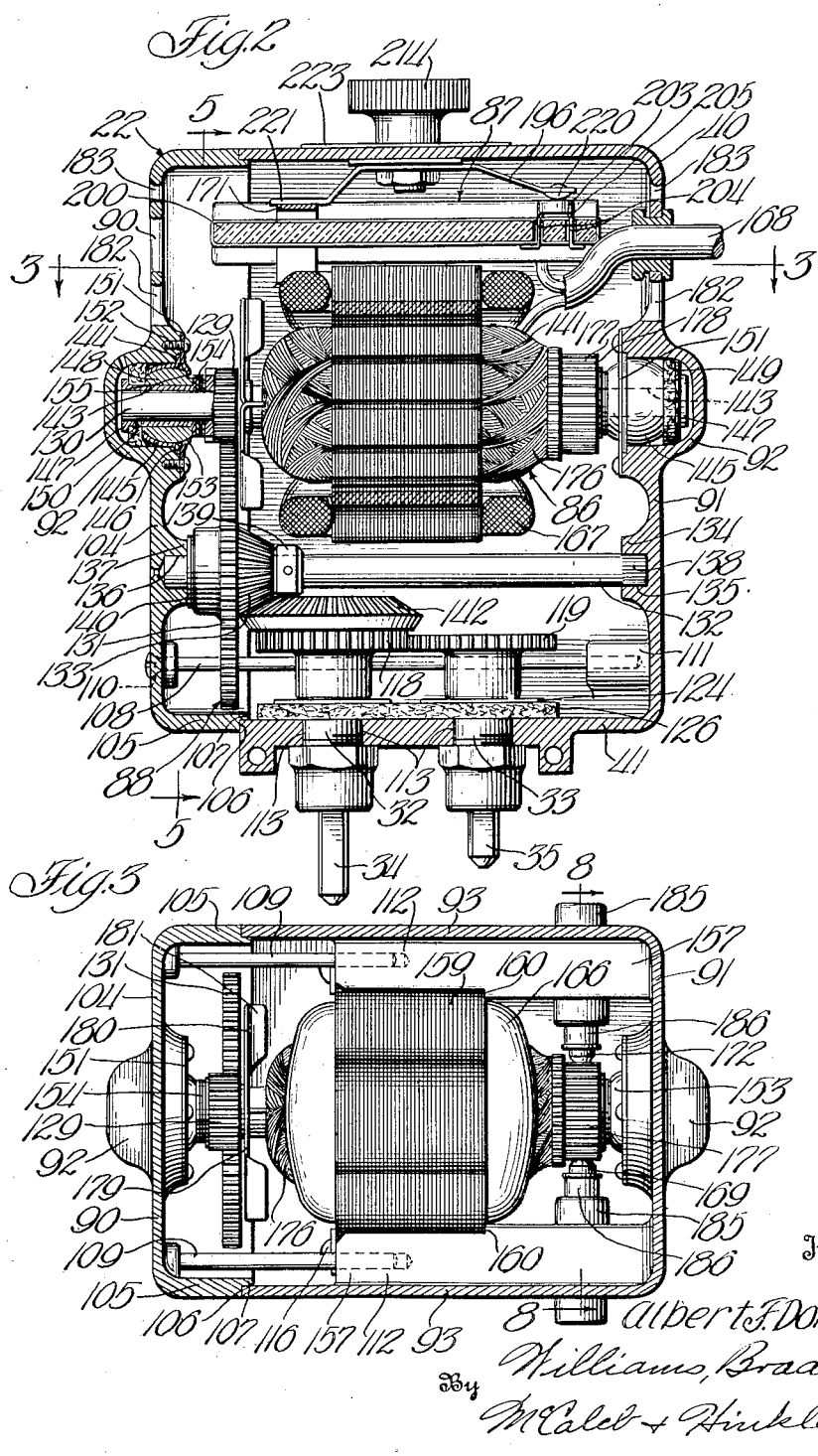

Oct. 3, 1933.  A. F. DORMEYER  1,928,965
ELECTRIC MOTOR UNIT
Original Filed Dec. 23, 1929    4 Sheets-Sheet 3
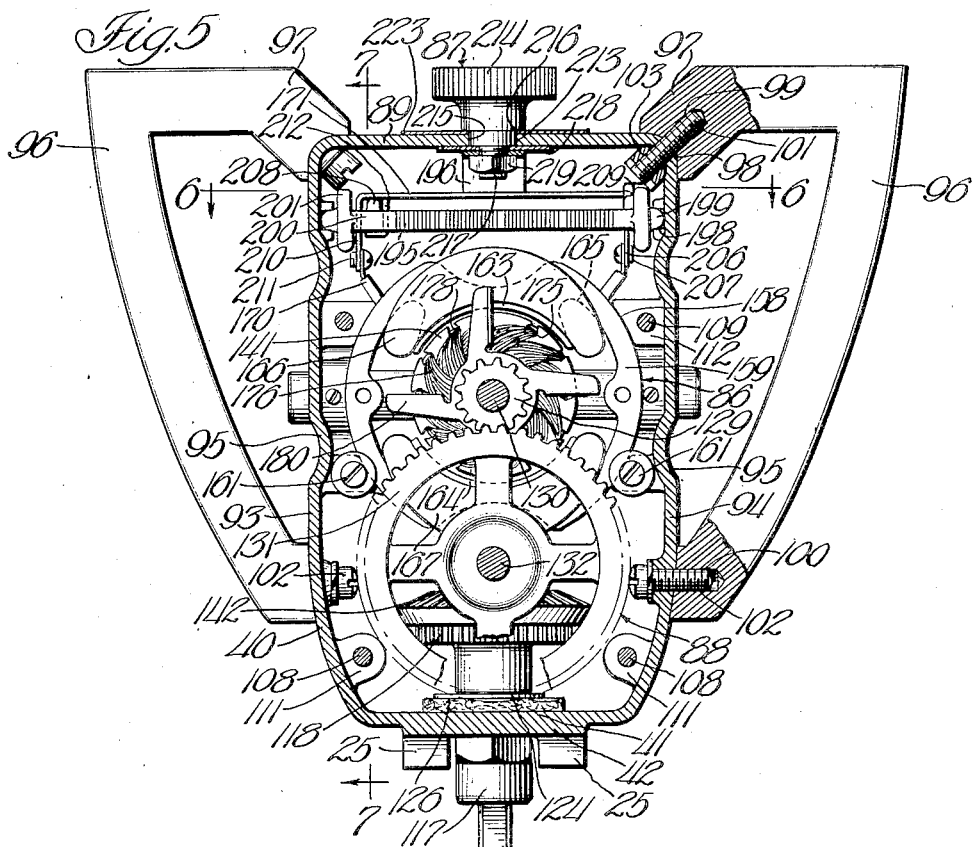
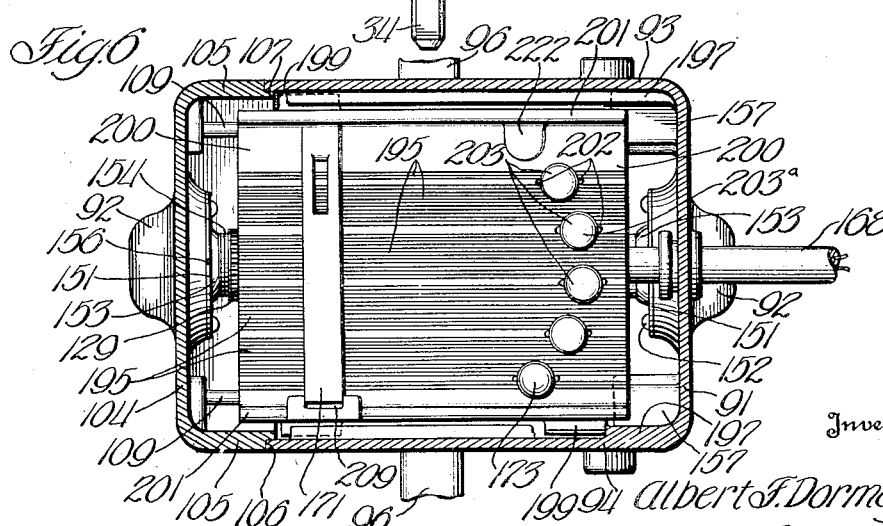
Inventor
Albert F. Dormeyer
By Williams, Bradbury,
McCalet + Hinkle  Attorneys

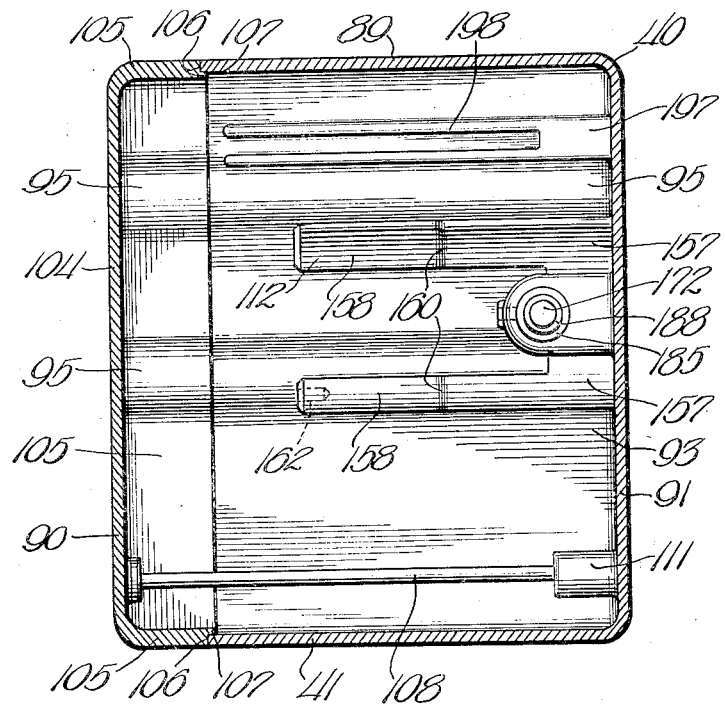
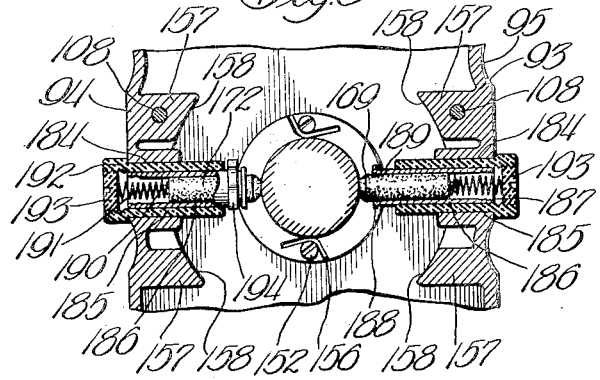

Patented Oct. 3, 1933

1,928,965

UNITED STATES PATENT OFFICE 1,928,965

ELECTRIC MOTOR UNIT

Albert F. Dormeyer, Chicago, Ill.

Original application December 23, 1929, Serial No. 416,027. Divided and this application March 3, 1930. Serial No. 432,670

9 Claims. (Cl. 172—36)

The present invention relates to electric motor units and is particularly concerned with portable motor units for use upon various household appliances.

While the preferred embodiment which has been chosen to illustrate the invention is a food mixer, the present motor unit is peculiarly adapted to be utilized for all kinds of household appliances such as fruit juice extractors, meat grinders, vegetable slicers, cream whippers, fans, massaging devices, floor and furniture polishers, emery wheels, polishing wheels, etc., and the use described is to be regarded as exemplary of one of the many uses of a portable power plant or motor unit which is universally applicable to household labor.

The food mixing devices of the prior art have not been provided with power units having sufficient range or flexibility of power and speed control for performing the different kinds of mixing or other labor required of such a device, and consequently, the prior devices were not adaptable to both high-speed and low-speed requirements. For example, the speed which is required for whipping cream or mixing light liquids is vastly different from that required for mixing dough for bread, and the devices of the prior art could not perform either or both of these functions with the perfection or rapidity which is desirable in a commercially successful machine.

Some effort has been made to adapt mixing devices to different kinds of work by the use of alternative gear ratios, but only a very limited number of speeds could be secured by such an arrangement, and such devices are complicated, noisy, unwieldy and incapable of satisfactory performance.

The prior devices have also been too heavy, and too large to be handled conveniently by women, expensive, difficult to clean, and difficult to operate or control.

One of the objects of the present invention is the elimination of the foregoing difficulties by the provision of an improved electric motor unit for household appliances having such a wide range of power and speed control as to be adaptable to practically all kinds of household labor.

Another object is the provision of a portable electric motor unit of the class described, which is light in weight, relatively small in size, and compact in construction, so that the device may be conveniently controlled and handled without physical effort, yet it includes a power source of sufficient strength to perform all types of physical household labor, and self-contained controlling devices which make the portable machine adaptable to the many different speed requirements for such labor.

Another object is the provision of a novel self-contained unit for household appliances, which includes speed reduction devices to permit the electric unit to operate at its most efficient speed, and speed controlling means to make the power unit capable of use with all kinds of household appliances having various speed requirements.

Another object is the provision of an improved electric motor unit for portable household appliances, which is capable of beating, mashing, mixing, whipping, pulverizing or stirring wet or dry food products of every consistency from thin liquids to thick batters or dry mixtures, with a variable speed control for every different power or speed requirement.

Another object is the provision of a portable electric motor unit for food mixers and other household appliances which may be safely left connected for convenient use and control by means of a self-contained switch located in the motor casing, and the paddles of which may be safely cleaned by running water while the motor is in operation.

Another object is the provision of an improved electric motor unit for household appliances, which is provided with a firm and positive, yet quickly detachable connecting device so that the motor unit may be safely and securely connected to an agitator unit to be supported by the same, but the agitator unit may be readily removed for cleaning and the motor unit may be applied to many other types of appliances.

Another object is the provision of an improved motor structure which is capable of more economical manufacture and assembly and from which all excessive weight has been eliminated for the purpose of providing a small power plant for household appliances which has a wider range of adaptability and power, but which is peculiarly adapted to be made much lighter than any of the motors of the prior art, so that it may be readily handled by women without excessive physical effort.

Other objects and advantages of the invention will be apparent from the following description and from the accompanying drawings, in which similar characters of reference indicate similar parts throughout the several views.

Referring to the drawings, of which there are four sheets;

Fig. 1 is an elevational view illustrating one of the uses of the present electric motor unit;

Fig. 2 is a vertical, sectional view taken through the motor unit on a plane determined by the axis of the armature shaft with certain of the parts in elevation;

Fig. 3 is a horizontal, sectional view taken on the plane of the line 3—3 of Fig. 2, looking in the direction of the arrows;

Fig. 4 is a detail sectional view taken on a vertical plane through the bottom of the casing at the axes of the power shafts, with certain of the parts in elevation to show the structure of the power shafts;

Fig. 5 is a vertical, sectional view taken on the plane of the line 5—5 of Fig. 2 with the motor and gear reduction mechanism shown in elevation.

Fig. 6 is a horizontal section taken on the plane of the line 6—6 of Fig. 5, showing the structure of the motor casing and the rheostat in plan.

Fig. 7 is a sectional view of the casing with the motor and rheostat removed, taken on the plane of the line 7—7 of Fig. 5;

Fig. 8 is a sectional view through the motor brushes taken on the plane of the line 8—8 of Fig. 3, looking in the direction of the arrows.

The present application is a division of my prior application, Serial No. 416,027, filed December 23, 1929, for electric food mixers, and the present application is directed particularly to the electric motor unit which comprises one of the parts of the food mixer covered by the parent application.

Referring to Fig. 1, the present electric food mixer, which is indicated in its entirety by the numeral 20, preferably consists of a separate agitator unit 21 and a separate motor unit 22. Both of these parts comprise unitary articles of manufacture, and the motor unit in particular is capable of use as a power plant with many different types of household appliances, of which the agitator unit or agitator attachment is one example.

The present food mixer is preferably made portable in order to widen its field of utility and adapt the food mixer for use in mixing food in all kinds of household utensils. While the present device is extremely sturdy and capable of long and efficient service, all excess weight has been eliminated by the provision of an improved structure, so that the complete mixer is so light that very little effort is required on the part of the user.

One of the primary purposes of the food mixer being to save physical effort on the part of the user, some of the objects of the present invention would be defeated if excessive physical effort were required for handling the mixer, and the present portable device possesses an adaptability and flexibility in its application to various household labors, which was not present in the devices of the prior art.

In order to eliminate the necessity for constant attention to the food mixer when the device is in operation or between successive operations when the agitator unit may be covered with the batter, or other ingredients which it is mixing, the mixer is preferably provided with a stable supporting member, such as the agitator unit 21, which is adapted to support the complete device in erect position under a large variety of different conditions, one of which is illustrated in Fig. 1.

For this purpose, it is also desirable that the motor unit 22 be provided with inherent balance and connected to the agitator unit 21 symmetrically so that the mixer is not overbalanced upon any side.

The agitator unit is shown in elevation in Fig. 1, and this unit preferably includes a supporting member or plate 23, a guard indicated in its entirety by the numeral 39, and one or more agitators 61. The supporting plate 23 forms a part of a positive and safe, yet quickly detachable, connection between the agitator unit 21 and motor unit 22, and for this purpose, a supporting plate 23 is provided with a socket 24 adapted to receive complementary male members or lugs 25 carried by motor unit 22.

Referring to Fig. 5, it will be observed that the casing 40 of the motor unit 22 is provided at its bottom 41 with a projecting body 42 for the purpose of securing the supporting plate 23 of the guard. The body 42 is preferably complementary in cross-section to the socket 24 formed in plate 23, and in the present embodiment, both the socket 24 and body 42 are made rectangular in shape.

The guard plate 24 is adapted to be received about the lugs 25 on the base of the motor unit 22 and to be secured thereto by a pair of transverse screw bolts 45 passing through the guard plate 24 and through the lugs 25. The transverse bolts 45 provide a firm yet quickly detachable connection between the motor unit 22 and any form of household appliance which is provided with a supporting plate 24.

The entire agitator unit may be readily removed from the motor unit without any mechanism such as gears or other parts that might be damaged by washing, and the agitator unit may be washed in the ordinary way of washing dishes, or by running the food mixer with the agitator unit in a bowl of cleansing fluid, such as soap and water. All of the metal parts of the agitator unit are preferably plated with corrosion resisting metal, such as chromium, and the casing 40 for the motor is preferably formed of a light aluminum alloy, capable of receiving a finish which is similar in appearance.

The electric motor unit 22 preferably consists of a unitary motor casing 40, which encloses and protects the motor 86, a speed control device 87, and a speed reduction device 88. The exact shape of the casing 40 does not affect the merits of the invention, except that it is highly desirable that the arrangement be light, and compact, and a very efficient, sturdy and powerful motor unit is provided by the specific arrangement illustrated.

The motor unit is illustrated in full size in Figs. 2 to 8, and the entire mixer is so light that it may be handled without appreciable physical effort, yet it is capable of performing many new functions besides all of the results which have been accomplished by the large heavy and complicated mixing devices of the prior art.

In the present embodiment, the motor casing 40 is provided with a substantially plane upper wall 89, front and rear walls 90, 91, which are plane except for the provision of bearing sockets 92, a bottom wall 41, which has already been described, and side walls 93, 94, which are substantially plane at their upper portions but curved inwardly adjacent the bottom of the casing. The transversely extending grooves 95 formed in the side walls 93, 94 enhance the ornamental appearance of the casing, and may also be employed as guides for receiving complementary parts carried by a standard or other support (not shown).

The casing 40 is closed by means of a cover of which the front wall 90 forms a part, the cover 104 also including a laterally extending flange 105, about the border of the front wall 90, the flange 105 being adapted to register with the top, bottom and side walls of casing 40. The flange 105 is preferably recessed at 106, forming a relatively thin aligning flange 107, adapted to be received within the walls of casing 40 to align the cover 104 with casing 40 and definitely determine the assembled position of cover and casing.

The cover 104 may be secured to casing 40 by a plurality of screw bolts 108, 109, which pass through the cover, having their heads embedded in countersunk recesses 110, and having threaded ends engaging threaded bores which are formed in lugs 111, 112 carried within casing 40 by the walls thereof.

Casing 40 is preferably provided with a pair of handles 96, one located on each of the side walls of the casing, and the handles 96 are preferably formed of electrical insulating material, such as a molded phenolic condensation product, called "bakelite". Handles 96 may be very firmly secured to the casing 40 by providing the upper end 97 of the handle with a transverse groove 98 which is adapted to receive the upper corner of the casing 40, so that the handle engages both the side wall 94 and the top wall 89.

The handle may be provided with threaded bores 99, 100, and secured to the casing by screw bolts 101, 102, which pass through the walls of casing 40, and the upper screw bolt 101 is preferably provided with a frusto-conical nut 103 adapted to be received in the corner in the interior of the casing, between the top wall 89 and side wall 94. The handle being drawn into firm engagement with both the top wall and the side wall by the bolt 101, and being also secured by the bolt 102, the handles are adapted to be firmly secured to the casing with a minimum amount of labor.

The handles 96 are also a great convenience for the housewife in the manipulation of the mixer since either hand may be used for steadying the mixer in pulverizing operations or other operations which require steadying, and the other hand may be used for controlling the speed of the motor.

The support or control of the device may be readily shifted from one hand to the other to enable the operator to reach for ingredients on either side, and if necessary both handles may be grasped in such manner that the motor unit may be held very firmly and a considerable amount of force brought to bear upon the work where the motor is used for other operations than food mixing.

The speed reduction mechanism 88 also forms a unitary part of the motor unit, being enclosed in the casing 40, and permanently secured thereto, so that no gears or other mechanism need be attached to the agitator unit, and the operator need have no hesitancy about placing the agitator unit in the water for washing on account of gears or other mechanism such as are used in the devices of the prior art.

Since the present agitator unit includes a pair of beater elements, the motor unit has been provided with a pair of drive shafts 34, 35, but it should be understood that it is not necessary to utilize both of the drive shafts when the motor is employed with other appliances. The bottom wall 41 of casing 40 may be provided with a pair of bores 113, for receiving bushings 32, 33, which form bearings for shafts 34, 35.

Referring to Fig. 4, it will be observed that each of the bushings 32, 33 has an axial bore 114 forming the bearing, an annular flange 115 engaging the inside of the bottom wall 41, and a threaded portion 116 for engagement with an internally threaded cap 117.

The bearing structure of each of the drive shafts is substantially identical, and consequently, only one of these structures need be described in detail. The drive shaft 34 is fixedly secured at its upper end to a combined bevel and spur gear 118, while the drive shaft 35 is secured in a similar manner to a spur gear 119, which is adapted to mesh with the teeth on the spur gear 118. All of the gears included in the present device may be made of cast metal and secured to the drive shafts by casting the gear about one end of the shaft, or the gears may be made out of fiber for the purpose of giving a more silent operation, in which case, the gears may be secured to the shaft by pins or other fastening means.

For the purpose of assembly, each of the drive shafts 34, 35, its bearing and gear, preferably consist of a unitary assembly, which is held together by the provision of an annular groove 120 formed in the shaft just below bushings 32, 33, and provided with a split ring 121 to prevent removal of the shaft from its bearing. Washers may be placed on either side of the split ring and an absorbent packing 122 carried in the cap 117 is adapted to prevent leakage of oil out of the bore 123 along the drive shaft. Each drive shaft assembly is also provided with a plate 124 confined between the hub of its respective gear and the bearing 32, and rotation between the bearing 32 and casing 40 is prevented by a pin 125. The bearings 32, 33 may be provided with a supply of lubricant by a piece of absorbent felt 126, which is placed on the bottom of the casing 40 about the annular flanges 115 of the bearing, and secured in place by the plates 124.

In order to provide a self-locating drive connection between the electric motor unit and the two-element agitator unit, one of the drive shafts, such as shaft 34, is made substantially longer than the other shaft 35, so that the shaft 34 projects below shaft 35. Both of the shafts have non-circular ends, the non-circular formations extending upward to a point within the bearing caps 117 on each shaft, and the complementary non-circular sockets 75 on tubular shafts 74 may be of sufficient length to receive either of the shafts, in order to secure standardization of parts.

The shafts 34, 35 are preferably provided with tapered portions 127 at their lower ends for engagement with the upper ends of the tubular shafts 74 so that the tapered surfaces 127 are adapted to automatically cam and rotate the tubular shafts 74 until they reach the proper rotative position for engaging the non-circular ends 128 of shafts 34, 35.

The provision of one shaft of greater length than the other enables the operator to first center and locate one of the beater elements on a shaft, after which the agitator may be rotated slightly upon the first and longer shaft to locate the second beater element upon the shorter shaft.

It will thus be observed that the present connection between the beater unit and motor unit with a pair of shafts may be very readily and easily affected by the mechanism provided, and the agitator unit is quickly attachable, as well as quickly detachable.

The speed reduction mechanism 88 also includes a pinion 129 carried by the armature shaft 130, a spur gear 131 rotatably mounted upon a shaft 132, the spur gear being also provided with a bevel pinion 133 fixed to rotate with gear 131. The rear wall 91 of casing 40 may be provided with an internally projecting lug 134, having a bore 135 which is in alignment with a bore 136 located in a similar lug 137 carried by cover 104. Shaft 132 may have a knurled end 138, and may be provided with a thrust bearing consisting of a collar 139 pinned to shaft 132. The knurled end 138 may have a drive fit in the bore 135, and the combined spur gear and bevel pinion 131, 133, is rotatably mounted on the shaft 132 between collar 139 and lug 137 with suitable washers 140 to facilitate proper meshing of the bevel gears. The drive shafts 34, 35 are thus adapted to be rotated by the motor armature 141 through the following train of gears; pinion 129 rotates spur gear 131, which carries bevel pinion 133, bevel pinion 133 rotates bevel gear 142 which carries spur gear 118, meshing with spur gear 119, and the spur gears 118, 119 being of the same size, both shafts 34, 35 rotate at the same speed.

The motor 86 may thus be operated at a relatively high rate of speed, such as the most efficient operating speed of the motor. In the embodiment illustrated, the speed reduction gear is adapted to reduce the speed in the ratio of nine to one, and with the speed control, which is described in full hereinafter, the present device is adapted to be operated at speeds of several hundred revolutions per minute to over 1500 revolutions per minute.

The motor shaft 130 is preferably provided with bearings 143 at each end, which are capable of a limited universal movement to automatically align the bearings 143 with shaft 130 when the cover 104 is placed on the casing 40. Each of these bearings may be substantially identical in form, and consequently, only one of the bearings is described in detail.

For instance, the cover 104 is formed with a substantially cylindrical socket 92 having an annular groove 144 located near the mouth of the socket. A stamped annular sheet metal member 145, forming a small portion of a sphere, is adapted to fit within the socket 92 with an outwardly extending flange 146 in groove 144. The bearing 143 comprises a sleeve 143 of bearing metal, which is provided with an annular flange 147 at its outer end, and which is fixedly secured with a ball-shaped metal member 148. The ball 148 fits within the spherical cup 145 and the flange 147 may support a felt packing 149 adjacent an oil conduit 150.

All of the foregoing parts are secured in the socket 92 by an annular plate 151, which is secured in place by screw bolts 152, and which is provided with an annular inwardly sloping flange 153 for engaging ball 148. Any number of washers 154 may be interposed between pinion 129 and bearing 143, and the plate 151 is preferably provided with a stamped depression for engaging in a slot 155 to permit universal movement of ball 148, but to prevent rotation of the ball. The plate 151 is also preferably formed with slots 156 extending into said plate from its outer edge about each screw bolt 152, so that the plate is secured in place by screws passing through resilient tongues formed on plate 151.

Referring to Figs. 5 and 7, it will be observed that the side walls 93, 94 of motor casing 40 are provided with inwardly projecting and transversely extending ribs or formations 157, the lugs on each wall being provided with an inner cylindrical surface 158 which is complementary in shape to the outer surface of the motor field core 159.

The provision of the inner cylindrical surfaces for supporting the motor field core, enables the accurate location of the field core with respect to the armature so that a high degree of uniformity is attained in the air gap between the field core and the armature under the ordinary conditions of manufacture and a high quality of motor structure may thus be produced more economically.

At the points 160 on each rib 157, a definite shoulder is formed against which the motor field core 159 rests and the field core may be secured in place by screw bolts and washers 161 threaded in bores 162 in the end of lugs or ribs 157. The motor field core 159 is preferably constructed of a multiplicity of laminations of soft iron, or similar material having high magnetic properties, each lamination being a substantially annular metal plate formed with two inwardly projecting pole pieces 163, 164, the pole pieces being widened at their ends to form grooves 165 for receiving the field windings 166, 167. Each of the field windings 166 consists of a coil of a plurality of turns of relatively heavy insulated wire adapted to carry full load current, since the present device is preferably provided with a series motor.

The field windings are preferably arranged in coils and covered with tape insulation before their assembly on the field core 159 and the coils are large enough so that they will pass over the projecting edges of the pole pieces 163, 164. After locating the field coil inside of the field core, the coil is pressed into the grooves 165 and brought to the conformation shown in Fig. 5 by curving the lateral portions of the coil outward on the core, and drawing the inner parts of the coil into the grooves 165. The two ends of the coil may also be secured in place by a cord which loops about the coil at each end and passes outside of the field core 159 to draw the coil into the grooves 165.

The armature 144 also comprises a plurality of laminations of soft iron, or other magnetic material, all of which are provided with registering recesses 174 and slots 175 leading to the outside of the armature. The elongated recesses 174 are adapted to receive the armature coils 176, consisting of a plurality of turns of insulated copper wire, the wire being retained in recesses 174 by strips of insulation 176 slid endwise into recesses 174 to close the slots 175. The ends of the respective armature coils 176 are connected to the insulated segments 177 of a commutator 178, fixedly supported on shaft 130, and the commutator 178 is adapted to be engaged by the oppositely disposed brushes 169, 172.

Any compact form of series winding may be used for the armature coils 176, and wire provided with lacquer insulation is preferably employed to reduce the size of the armature and increase its efficiency. The shaft 130 also supports a fan 179, consisting of a sheet metal plate having a plurality of radially extending armatures 180 with inwardly turned blades 181.

The casing 40 and cover 104 are also provided with a plurality of ventilation openings 182 located about each end of the shaft in the front and rear walls, and these walls may also be provided with ventilation openings 183 adjacent the top to provide ventilation for the rheostat 87.

The side walls 93, 94 are provided with bores 184 at points diagrammatically opposite each other with respect to the commutator 178, and the bores 184 support bakelite tubes 185 for insulating the brushes 169, 172. The bakelite tubes 185 are each molded about a sheet metal tube 186, having a crimped end 187 to provide anchoring formations, and the metal sleeves are provided with annular flanges 188 at the inner end, the sleeves 188 projecting sufficiently from the insulating bushings 185 to form a connector 189.

The brushes 169, 172 may consist of carbon rods, each formed with a small head 190, about which one end of a helical spring 191 may be engaged. The insulating bushings 185 are provided with internal threads 192, and an insulating screw plug 193 is threaded in the end of each bushing 185 to compress the helical springs 191 and maintain the brushes 169, 172 in engagement with commutator 178. The connectors 189 are peculiarly adapted to receive the resilient clamping fingers 194 of connectors carried by conductors leading from the field coils 166, 167.

The speed control device 87 preferably consists of a series rheostat, including a plurality of resistance windings 195, the various turns of which may be successively connected in series with the armature and field circuit of motor 86 by a movable switch arm 196.

Referring to Fig. 7, it will be observed that the side walls 93 and 94 are each provided with transversely extending ribs 197 adjacent the top, the ribs 197 having longitudinal slots 198 for slidably receiving the edges 199 of an insulating support 200 for rheostat 87.

The insulating support 200 may consist of a molded porcelain member or plate of substantially rectangular form preferably provided with upwardly projecting and downwardly projecting flanges 201 at each end to form a barrier between the contacts and other metallic parts of the rheostat, and the casing 40. The rheostat is retained in its guides 198 by engagement of the flanges 107 of the cover with the edges 199 of the porcelain.

The porcelain supporting plate 200 of rheostat 87 is provided with a plurality of apertures 202, located in two series along two concentric arcs, and the apertures 200 provide means for securing a plurality of rheostat contacts 203, each of which consists of a sheet metal cup or head, having a pair of downwardly extending prongs 204 for clamping the contact to the porcelain.

The resistance windings 195 consist of a plurality of spaced turns of resistance wire, and the contact bodies 204 form contact with the turns 195 by the engagement of the lower sides 205 of contacts 203 with adjacent turns of the coils 195.

The last contact 173 is preferably provided with a downwardly extending metal flange 206 provided with a screw 207, forming a connector for connection with one of the supply conductors. The porcelain body 200 is also provided with an upwardly projecting lug 208 for supporting an elongated metal strip 171 forming one of the contacts of the rheostat 87.

The elongated metal strip 171 has one end supported in a recess 209 formed in a flange 201, and the opposite end is bent downward and passes through an aperture in the porcelain body 200, to form a connector 210, provided with a screw 211. The metal strip 171 is also provided with a punched tongue 212, which is bent downward through another aperture in porcelain body 20 and bent into engagement with the bottom of the porcelain body to secure the elongated contact strip 171 on the porcelain body 200.

The upper wall 89 of casing 40 is provided with a centrally located bore 213 for receiving an insulating thumb piece 214, and the thumb piece 214 is provided with a portion 215 of reduced diameter, forming a shoulder 216 for engaging the top of the casing. The thumb piece 214 is preferably provided with a screw bolt 217, having its head molded in the thumb piece 214, and having a flattened lower portion for non-rotatably supporting a movable contact 196. An insulating washer 218 is interposed between the movable contact 196 and the casing wall 89, and the contact 196 is secured on bolt 217 by a nut 219.

Referring to Fig. 2, it will be observed that one end of contact arm 196 is provided with a contact rivet 220, having a curved face for slidably engaging the contact bodies 203, 173, and the opposite end 221 of contact arm 196 is adapted to engage the elongated strip contact 171. The porcelain body 200 is also provided at one side with a porcelain projection 222, simulating the shape of a contact 203 and adapted to serve as a dead contact for the off-position of the switch arm 196.

The nameplate 223 may be interposed between the thumb piece 214 and casing wall 89, and the wall or nameplate is preferably provided with indicia, such as "on" or "off" with appropriate arrows, or a scale for indicating the various positions of switch arm 196.

One end of coil 166 is connected to one of the wires leading to the supply conductors 168, while the other end of coil 166 is connected to one of a pair of brushes 169. One end of coil 167 is connected by conductor 170 to the elongated fixed contact 171 of the rheostat 87, and the other end of coil 167 is connected by a conductor to brush 172. The last contact 173 of a series of rheostat contacts is the other terminal of the rheostat 120 which is connected to the other wire of the supply conductors 168.

It will thus be observed that the rheostat 87, field coils 166, 167, and armature coils 176 are adapted to be connected in series by means of the switch arm 196, and when the switch arm 196 rests on the dead contact 222, the circuit is broken through all three of these elements.

Since one end of the motor circuit is connected by conductor 170 to one end of the elongated fixed contact 171, the movable contact 196, which engages the strip 171, is adapted to connect in the circuit various turns of the resistance wire 195, depending upon engagement of the contact 220 with the various rheostat buttons 203. When the contact 220 is in engagement with the upper rheostat contact 203 in Fig. 6, the entire set of resistance windings 196 is in circuit, so that the second position of the thumb piece 214 provides the slowest rate of speed. When the contact 220 is moved to the position to engage the second rheostat contact 203A, one-fourth of the resistance wire 195 is cut out, and three-fourths of the rheostat resistance is in circuit, and so forth. When the contact 220 has reached the last rheostat contact 173, all of the resistance is cut out, and the motor operates at its highest speed.

The mechanical operation of the foregoing food mixer will be evident from the foregoing description and statement of the functions of the various parts. However, the present combination of series rheostat control, series motor and speed reduction device are particularly effective for the purpose of providing a food mixer or household power unit having a wide range of adaptability and speed control for various purposes.

The series commutator motor is capable of operation on either direct or alternating current at ordinary lighting circuit voltages, and the characteristics of the motor are such that the motor is equally adaptable to mashing potatoes or mixing heavy batter at slow speeds as it is to the high speed mixing of relatively thin liquids or material to be whipped.

When the mixer is used in a relatively thick batter, the increased resistance tends to decrease the speed of the motor, which decreases the counter-electromotive force generated in the armature, and the motor takes an increased current, providing the necessary power for mixing the relatively thick batter.

While the motor has the inherent capability of decreasing its speed considerably under conditions of such an increased load, the best operation is secured by the use of the series rheostat, which further decreases the speed of the motor and gives a relatively powerful mixing device which operates at a very low speed when mixing heavy or thick batters.

Since the rheostat is in series with the motor, when an increased load is placed upon the series motor having a series rheostat, the increased current makes a larger potential drop across the rheostat, and consequently, reduces the effective voltage on the motor. This reduction in the voltage impressed on the motor gives a proportional reduction in speed which also gives a decreased counter-electromotive force and further results in increased current with increased power and slower speed.

The various steps provided on the rheostat are thus adapted to provide a much wider range of speed control than would be provided by a rheostat with any other arrangement, and the present food mixer has been found to be peculiarly effective and adaptable to all kinds of mixing, performing many operations which have heretofore not been possible with any motor driven food mixer.

It has already been pointed out that the motor unit is compact, light, capable of use with all kinds of motor driven household appliances and economical in its manufacture and assembly.

The inclusion of the series rheostat, series motor, and speed reduction mechanism in the single unitary casing enables the provision of a small and portable power unit for household appliances which has a high degree of flexibility and which is perfectly adapted to be used for driving all kinds of domestic devices.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a motor unit for household appliances, the combination of a casing having substantially rectangular sides and having a separable cover, bearings carried by said casing and cover, an armature having a horizontal shaft rotatably mounted in said bearings, said casing having inwardly projecting lugs forming a round field core support, a field core having an outer cylindrical surface for engaging said lugs, a pair of vertically extending power shafts, rotatably mounted in said casing and operative mechanical connections between said power shafts and armature shaft in said casing.

2. In a motor unit for household appliances, the combination of a casing having substantially rectangular sides and having a separable cover, a power shaft rotatably mounted in the bottom of said casing, a motor structure having an armature shaft rotatably mounted in said casing and cover, speed reduction gearing connecting said shafts, guides formed on the inside of the walls of said casing, and a rheostat slidably mounted in said guides on said casing and confined in place by said cover.

3. In a motor unit for household appliances, the combination of a casing having substantially rectangular sides and having a separable cover, a power shaft rotatably mounted in the bottom of said casing, a motor structure having an armature shaft rotatably mounted in said casing and cover, speed reduction gearing connecting said shafts, guides formed on the inside of the walls of said casing, a rheostat slidably mounted in said guides on said casing and confined in place by said cover, an insulating actuating knob rotatably mounted in said casing and a rheostat arm carried by the inner end of said arm.

4. In a motor unit for household appliances, the combination of a casing having substantially rectangular sides and having a separable cover, a pair of power shafts rotatably mounted in one end of said casing, a motor in said casing, a rheostat in said casing, a rheostat switch arm having an insulating knob projecting from the top of said casing for controlling said motor, and a pair of insulating handles having corner engaging formations engageable with the corner contour of said casing and secured thereto.

5. In a motor unit for household appliances the combination of a motor casing with a series electric motor in said casing, a rheostat comprising an insulating base removably mounted in said casing and connected in series with the field and armature of said series motor, an insulating knob rotatably mounted in the wall of said casing and having a movable contact arm located in said casing, a multiplicity of contacts carried by said rheostat for engagement with said arm, one of said contacts being adapted to effect continuous engagement with said arm and others of said contacts being connected to spaced turns of resistance wire on said rheostat, a pair of drive shafts rotatably mounted in the wall of said casing opposite to said insulating knob, and speed reducing gearing connecting said motor and said drive shafts.

6. In a motor unit for household appliances the combination of a motor casing with a series electric motor in said casing, a rheostat comprising an insulating base removably mounted in said casing and connected in series with the field and armature of said series motor, an insulating knob rotatably mounted in the wall of said casing and having a movable contact arm located in said casing, a multiplicity of contacts carried by said rheostat for engagement with said arm, one of said contacts being adapted to effect continuous engagement with said arm and others of said contacts being connected to spaced turns of resistance wire on said rheostat, a pair of drive shafts rotatably mounted in the wall of said casing opposite to said insulating knob, speed reducing gearing connecting said motor and said drive shafts, said motor casing being provided with ventilation apertures located adjacent said rheostat and a fan driven by the motor shaft and adapted to effect forced ventilation through said casing about said rheostat.

7. In a motor unit for household appliances the combination of a substantially rectangular casing with a motor unit located in said casing, a pair of drive shafts rotatably mounted in one wall of said casing, a motor speed control device located in said casing and having a control member carried by the wall opposite to said drive shaft, and a pair of double ended handles, said handles being located on the opposite walls of said casing and each handle having both of its ends secured to said casing.

8. In a motor unit for household appliances the combination of a substantially rectangular casing with a motor unit located in said casing, a pair of drive shafts rotatably mounted in one wall of said casing, a motor speed control device located in said casing and having a control member carried by the wall opposite to said drive shaft, a pair of double ended handles, said handles being located on the opposite walls of said casing and each handle having both of its ends secured to said casing, said casing being formed with outwardly projecting lugs surrounding said drive shafts, a supporting plate adapted to cover said lugs, and a pair of auxiliary tubular shafts rotatably mounted on said supporting plate and adapted to engage said drive shafts.

9. In a food mixer motor unit, the combination of a casing with a series-wound motor therein, a pair of drive shafts of unequal length carried by one of the walls of said casing and adapted for conjoint rotation, operative mechanical gear reducing connections on the interior of said casing between said motor and said drive shafts, said drive shafts protruding to the exterior of said casing and being adapted for self-aligned connection to driven members, said casing having a flanged portion adjacent said shafts on the exterior of said casing to facilitate such connection, a variable resistor in series connection with said motor in said casing to control the speed and power available at said shafts, said casing being provided with ventilation openings and fan means actuated by said motor effecting forced ventilation through said casing.

ALBERT F. DORMEYER.